United States Patent [19]

Atalla

[11] 4,304,990

[45] Dec. 8, 1981

[54] MULTILEVEL SECURITY APPARATUS AND METHOD

[75] Inventor: Martin M. Atalla, Atherton, Calif.

[73] Assignee: Atalla Technovations, San Jose, Calif.

[21] Appl. No.: 118,584

[22] Filed: Feb. 4, 1980

Related U.S. Application Data

[63] Continuation-in-part of Ser. No. 102,858, Dec. 11, 1979.

[51] Int. Cl.³ .............................................. G06K 7/01
[52] U.S. Cl. ................................. 235/380; 235/379; 235/381
[58] Field of Search ....................... 235/379, 380, 381; 340/149 A, 152 R

[56] References Cited

U.S. PATENT DOCUMENTS

| | | | |
|---|---|---|---|
| 3,845,277 | 10/1974 | Voss et al. | 235/381 |
| 3,862,716 | 1/1975 | Black et al. | 235/381 |
| 3,938,091 | 2/1976 | Atalla et al. | 340/152 R |
| 4,016,405 | 4/1977 | McCune et al. | 235/380 |
| 4,198,619 | 4/1980 | Atalla | 235/381 |

*Primary Examiner*—Harold I. Pitts
*Attorney, Agent, or Firm*—A. C. Smith

[57] ABSTRACT

A card-coding system and method preserves the security of the encoding process against duplication and counterfeiting of cards by securing the interactions under the control of the individual and then of the issuing institution. Multilevels of offset codes are generated in successive interactions so that attempted alteration, duplication, or counterfeiting of a coded card will be readily detectable using "off-line" card-checking apparatus. An "active" card is initially issued or authorized with an established credit balance, and its authenticity, balance, and proper use are continuously checked, debited and updated in each authorized transaction completed by the proper individual.

4 Claims, 5 Drawing Figures

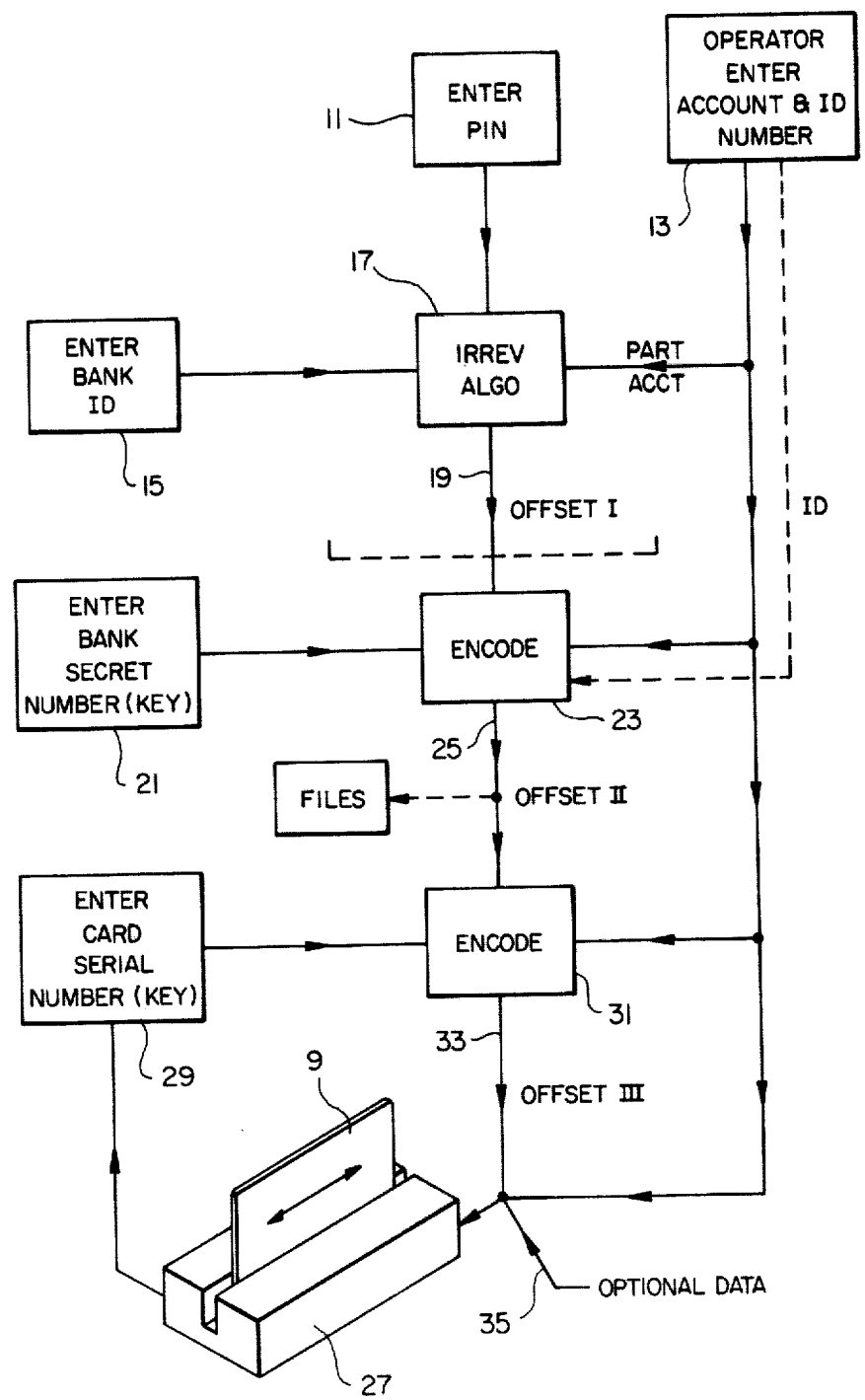
FIG_1

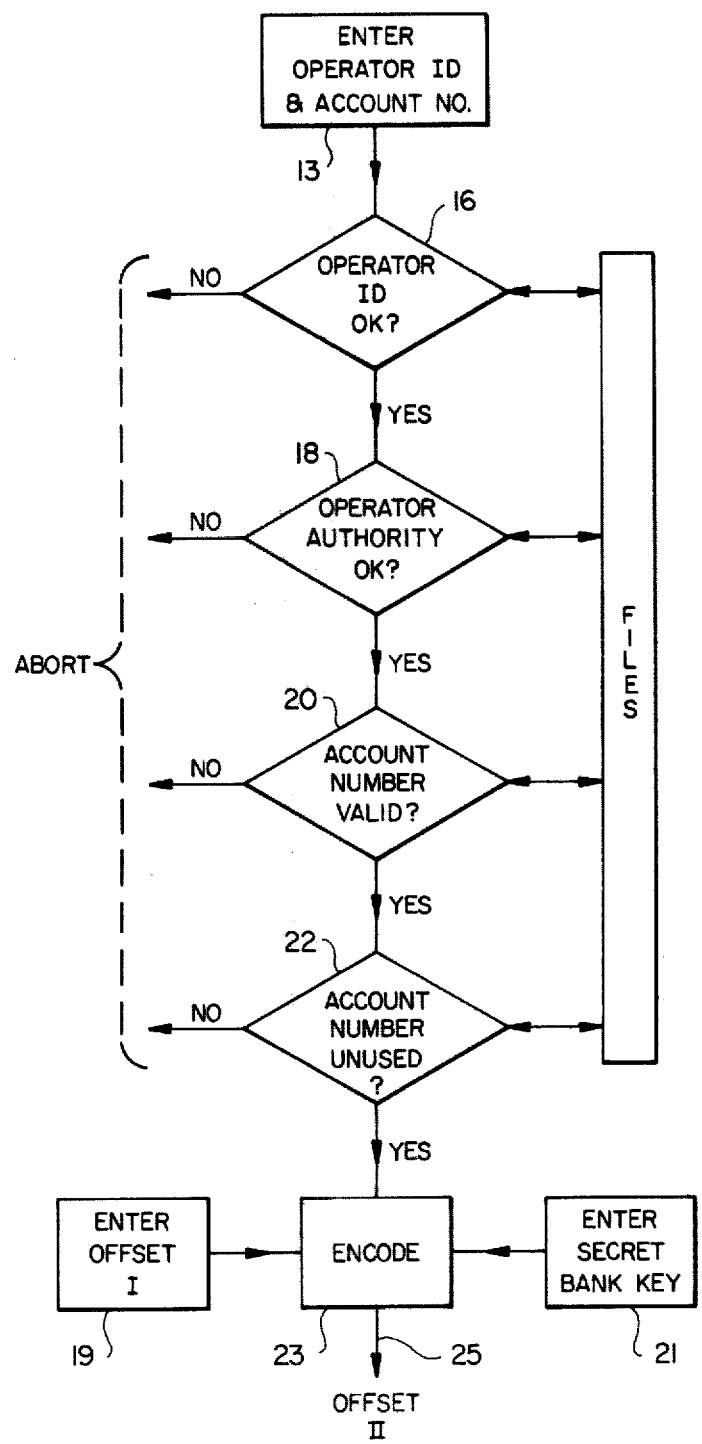
FIG_2

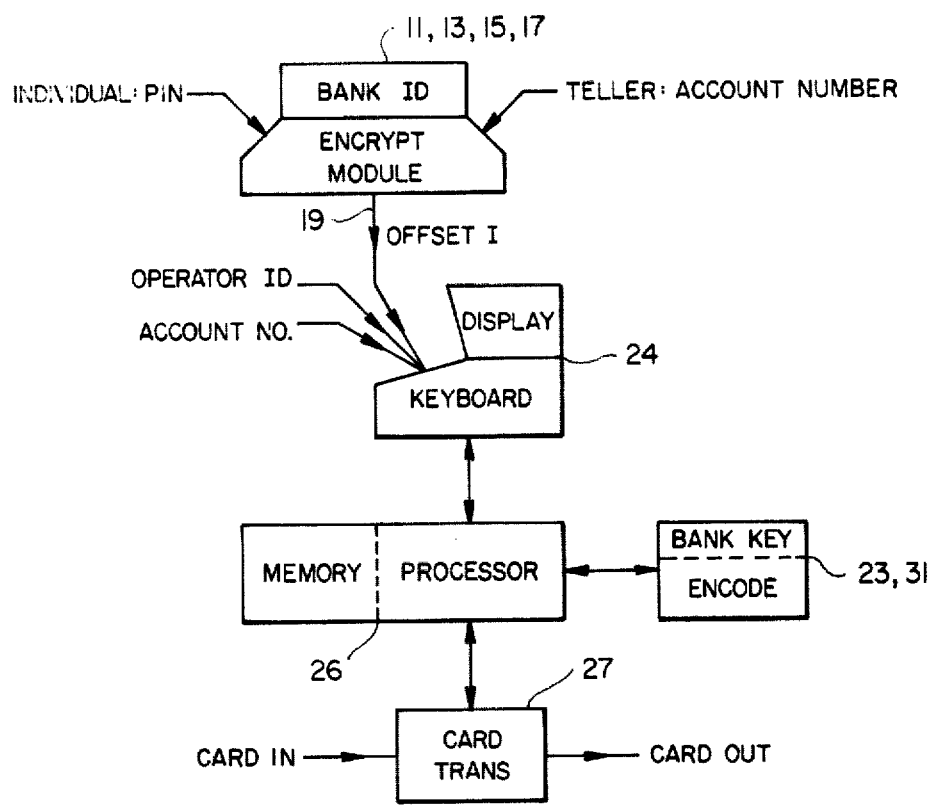
FIG_3
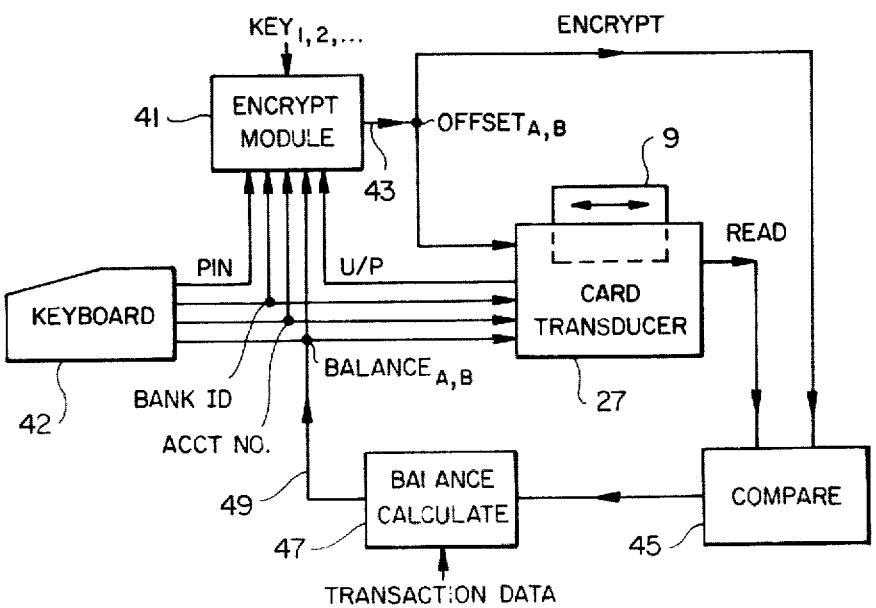
FIG_4

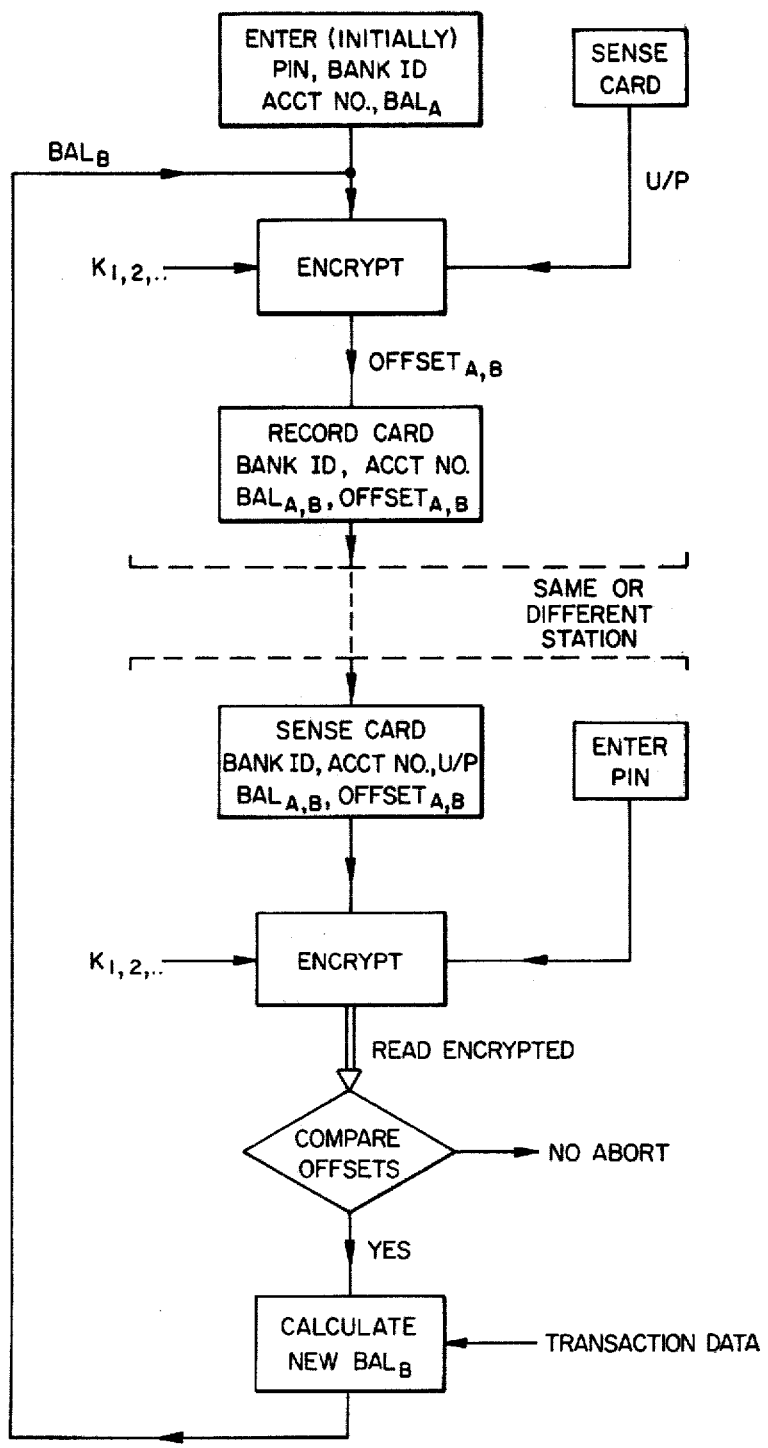
FIG_5

MULTILEVEL SECURITY APPARATUS AND METHOD

CROSS-REFERENCE TO RELATED APPLICATION

This application is a continuation-in-part application of pending application Ser. No. 102,858 entitled MULTILEVEL SECURITY APPARATUS AND METHOD, filed Dec. 11, 1979, by Martin M. Atalla.

BACKGROUND OF THE INVENTION

Retailing businesses and banking institutions are currently suffering substantial financial losses due to unauthorized use of credit cards in the conduct of business at the consumer level. The problem of detecting counterfeit credit cards and unauthorized users of valid cards prior to completion of credit-card transactions has not been effectively solved to date. Banking institutions which are equipped with card-operated banking equipment are generally able to detect an attempted unauthorized use of a credit card because such banking equipment is conveniently connected to the institution's central processor and computer files for "on-line" operation of the equipment at each step in a credit-card transaction. However, the great majority of credit-card transaction by retailers around the world is usually completed in amounts under set credit limits without the convenience of "on-line" computer checking of each step in the transaction. Instead, simple "off-line" credit-card checking techniques are used which are based upon a comparison of the card number against a compiled listing of numbers of unauthorized cards and a visual check of a user's signature against a sample signature. Such lists of numbers of unauthorized cards are largely ineffective in reducing credit losses because of the delay in compiling and distributing the lists, and because such lists do not identify valid cards that have been reproduced or counterfeit cards that bear fictitious numbers.

Even inherently more secure transactions which are controlled by "on-line" interactive computer processing are subject to security violations resulting from insufficiently secured procedures used in issuing cards initially. Unscrupulous personnel within a card-issuing institution may compromise the security of an "on-line" card-operated, computer-controlled system, for example, by causing issuance of a card with an account or identification number that was previously assigned.

SUMMARY OF THE INVENTION

In accordance with the present invention, method and means are provided for securing card-oriented transactions at several levels of interaction between a card-issuing institution, its personnel, its customers and even its suppliers of blank cards. The present invention provides enhanced security against the duplication and proliferation of one valid card and against counterfeit cards with fictitious numbers by securing the interactive transaction between an individual and the institution upon establishment of the individual's new account, as well as securing the transaction involved at the institutional level in issuing the card to the individual. In addition, the present invention operates to secure the card against duplication in instances where each issued card has a unique identification. In this way, the individual may be assured that his interaction with the card-issuing institution is secured and that the institution's interactions with its personnel and its suppliers of cards are secured. Further, the present invention operates to establish an "active" card which is initially issued or authorized with an established credit balance, and which is progressively checked for authenticity and debited in each authorized transaction.

DESCRIPTION OF THE DRAWINGS

FIG. 1 is an illustration of the system involved in issuing a card and in using an issued card in an "off-line" card-checking transaction;

FIG. 2 is a flow chart illustrating the information supplied to and produced by the apparatus of the present invention;

FIG. 3 is a block diagram of the apparatus of the present invention for issuing cards to specific individuals in a manner that preserves a high degree of security at all levels of interaction;

FIG. 4 is a block diagram showing a variable-offset "active" card system according to the present invention; and FIG. 5 is a flow chart illustrating the process of authenticating and updating the "active" card in accordance with the invention of FIG. 4.

DESCRIPTION OF THE PREFERRED EMBODIMENT

Referring now to FIG. 1, there is shown a pictorial and schematic diagram of the system of the present invention which operates on the personal identification number (PIN) of an individual (selected and known only by the individual), and on identification information furnished by an operator of the system to generate a credit card 9 which is unique to the individual and which is secured against unauthorized preparation or counterfeiting through multilevels of secured interactions.

In the initial sign-on transaction, an individual may select any code word or set of numbers, or combination thereof, which he may preserve in total secrecy and which he enters 11 initially into the system via any conventional means such as a keyboard, telephone dial apparatus, or the like. In addition, an operator of the system enters an assigned account number 13 (and also identifies himself using his own identification word or number). Optionally, the identification number of the institution (e.g., route and transit number of a bank, etc.) may also be furnished 15. Thus, the individual's secret identifying code (PIN) 11 plus all or an initial part of the new account number 13, plus any desired identification information pertaining to the institution, is supplied to an encoding device 17 for irreversible encryption of the data to generate a first compiled code word, or OFFSET I at the output 19 of the encoding device 17. The encoding device 17 may include a conventional National Bureau of Standards (NBS) data-encryption integrated circuit (commercially available from Motorola, Inc.) having multiple inputs for encoding the signals applied thereto, and may be operated according to a known irreversible algorithm (for example, as disclosed in U.S. Pat. No. 3,938,091 and in U.S. patent application Ser. No. 879,784, now issued as U.S. Pat. No. 4,198,619) to yield an OFFSET I of fixed length for any length of applied code words. This initial encryption may be performed on an isolated encrypting device to produce OFFSET I for transmission by conventional means to the next encoding means 23. Thus, the first level of interaction between the institution and the individual which produces the OFFSET I is secured by the individual who retains the secrecy of his own PIN.

At the next level of interaction, the institution is able to secure the transaction against unauthorized operation of the system by unscrupulous personnel. The institution may perform a number of checks and inquiries, as later described, relative to the authority of the system operator, the status of the assigned account number, etc., prior to encoding in the encoding means 23 the new account number, the OFFSET I and a secret identification key 21 that is unique to the institution. Upon successful completion of checks and inquiries by the institution, the encoding means 23 (for example, including an aforementioned NBS circuit) may encrypt the applied data according to an algorithm of the type described in the aforementioned U.S. Pat. No. 3,938,091 or U.S. patent application Ser. No. 879,784, or the like, to yield a new compiled code word of OFFSET II at the output 25 of the encoding means 23. This OFFSET II may be stored in files, for example, computer memory, printed lists, or the like, for later use with respect to transactions involving the individual and his card 9. Thus, the second level of interaction which produces OFFSET II required to produce a secured card 9 is under the security and control of the institution which may perform numerous checks and inquiries, later described herein, and which also retains the secrecy of its own secret key 21.

In many applications, the OFFSET II may be used directly to prepare a card 9 by encoding the card 9 magnetically, optically, mechanically, etc., in known manner with the account number and OFFSET II. Subsequent use of the card 9 thus produced in connection with a secured transaction would require entry of the individual's PIN 11 at the time of a transaction, the account number 13 (omitting an operator's I.D.), the bank I.D. 15 and the bank secret key 21, all in the manner previously described to produce an OFFSET II according to the same algorithms and encryption schemes used in the initial sign-on transaction, which OFFSET II could then be compared in known manner with the OFFSET II detected from the card 9 as the basis for determining whether the authorized individual who is unique to the card 9 is attempting to complete a secured transaction.

However, in certain applications requiring an additional level of secured interaction, the present invention may be used to ensure that no valid card can be duplicated. Thus, the supplier or actual issuer of cards (i.e., where different from the entity that generates OFFSETS I and II), may introduce an additional level of secrecy in producing the card 9. Each card 9 may be produced with a unique code or serial number which is different for each card. This unique code or serial number may be permanently implanted in each card mechanically, optically, magnetically, or the like, for subsequent detection by card transducer 27. The card serial number 29 thus detected is applied to encoding means 31 which may also contain an NBS circuit of the type previously described, for encrypting with OFFSET II and the account number in a known manner (for example, in accordance with the encryption algorithm disclosed in the aforecited U.S. Pat. No. 3,938,091 or U.S. patent application Ser. No. 879,784) to produce a compiled code word, or OFFSET III at the output 33. A fully encoded card 9 may now be produced by card transducer 27 which can produce a record thereon mechanically, optically, magnetically, or the like, in known manner (but without altering the card serial number) from OFFSET III, the account number, and optional data 35 such as expiration date, access restrictions, credit limits, etc. The OFFSET III which may be of fixed length and which is unique for one card, one individual and one bank, may be recorded on the card 9 in location preceding the account number for subsequent detection and comparison during completion of a secured transaction. Movement of a card 9 through card transducer 27 suffices to detect the serial number 29 of the card, and movement again (say, in the opposite direction) suffices to make the aforementioned recordings on the card 9 that are unique to the individual and institution.

During the completion of a subsequent secured transaction using the card 9, the authorized individual may enter his PIN 11 and his own assigned account number, and submit his card 9 for detection of its serial number and the recorded OFFSET III thereon. Substantially the same encryption of applied codes (except for the identifying code of a system operator during initial sign-on) may be completed to produce an OFFSET III for comparison with the OFFSET III detected from the card 9. Upon detection of parity of the newly-generated OFFSET III with the OFFSET III read out from the card 9, the transaction may be completed with respect to the individual whose PIN 11 was entered. Other subsequent code comparisons involving a recorded card 9 may also be performed using less than such full "on-line" checking capability, for example, under circumstances where the serial number of the card is implanted therein by secret means (as in certain European banking systems). Under such circumstances, the OFFSET II may be recorded on the card 9 for encoding "off-line" only with similar means as encoding means 31 upon the individual's entered account number and the OFFSET II and card serial number detected from the card. The OFFSET III thus produced must compare favorably with the OFFSET III read out from the card 9 to signal an authorized transaction.

Referring now to FIG. 2, there is shown a flow chart of the present invention which illustrates the logic expansion thereof for the protection of the institution at the aforementioned second level of interaction. Note that several checks and inquiries may be completed relative to the institution's operating personnel prior to generating the OFFSET II. For example, the institution may check the identification number 16 of the system operator against its file information to ensure that only its authorized personnel can operate the system. Upon successful completion of the first check, the operator's authority to assign an account number 18 may be checked against file information. Upon successful completion of this check, then account information may be checked 20 to determine, for example, that the assigned account number is one which the institution previously set up to be assigned. Also, the institution may check file information to ensure that a previously-assigned valid account number is not reassigned to another individual as well. Numerous other checks and inquiries may be made by the institution consistent with the security objectives it endeavors to meet and prior to encrypting in encoding means 23 the OFFSET I 19, the secret key 21 and account number, as previously described, to generate the OFFSET II.

Referring now to FIG. 3, there is shown a block diagram of the apparatus for operation according to FIGS. 1 and 2. The initial level of interaction with an individual newly signing on may be performed by an encrypting module 11, 13, 15, 17 having one keyboard upon which the individual may enter his PIN secretly and another keyboard upon which an operator or teller may enter an account number. The module may also have a bank identification number (e.g., route and transit number) included therein for encoding with the keyboard-supplied information. Such modules and their operation are described in the literature (see, for example, U.S. Pat. No. 3,938,091 and U.S. patent application Ser. No. 879,784). Using an irreversible encryption algorithm of the type described, the module produces an OFFSET I of fixed word length independently of the length of the applied PIN and account number and bank identification number, and therefore preserves the security of the PIN for the assigned account number. The OFFSET I can be conveniently transmitted without security to the next station where an operator authorized to issue cards may complete the initial sign-on of an individual. Using a keyboard with display 24 coupled to a processor with memory files 26 in conventional configuration, an operator may enter his identification number and the OFFSET I and the account number for controlling the processor 26 to perform the initial check and inquiry and the subsequent encryption in encoding module 23, as described in connection with FIG. 2. The secrecy of the bank key 21 may be preserved by retaining it in volatile manner within the encoding module 23, 31. Thereafter, the processor 26 may control the card transducer 27 to detect the secretly and permanently recorded serial number on a card and to control the encoding module 23, 31 (may be the same module time shared) to produce and record the OFFSET III from the OFFSET II and the card detected serial number. In this way, the institution may complete the assignment of a recorded card 9 to an individual using the apparatus at diverse locations without compromising the security against card duplication and counterfeiting which the present system provides to the individual, the institution and even the card-issuing entity.

Referring now to the diagram of FIG. 4 and the flow chart of FIG. 5, there is illustrated a simplified method and means of operating an "active" credit card terminal in accordance with the present invention. As in the previous embodiment, each credit card 9 has a unique parameter such as an optical or magnetic mark, or code number, which is permanent and unalterable in the card, and which can be read by card transducer 27. Such a credit card 9 may be "activated" for a specific individual with an initial balance by supplying to the encryption module 41 via keyboard 42 a bank identification number, an account number for the individual, his own personal identification number (PIN) and his initial deposit, or balance. In addition, the card transducer 27 is capable of sensing the unique parameter of the particular credit card that is assigned to the individual, and that unique parameter is also supplied to the encryption module 41. One or more levels of encryption may be performed in conventional manner or as described above under control of one or more encryption key codes $K_1$, $K_2$, ect., (which may represent the bank number) to produce an offset$_A$ 43 which is unique for that individual with that credit card and that particular credit balance in his account. This offset$_A$ 43, along with the other information about the bank, the account number, and the credit balance are then recorded or encoded in volatile manner (as on a conventional magnetic stripe) on the particular credit card 9 as it is moved through the card transducer 27. The card is now available to be used at the same or other similar terminals in connection with credit-card-controlled transactions.

When the credit card 9 is to be used in connection with a card-controlled transaction, it is sensed by the card transducer 27 to read therefrom the bank number, account number, credit balance, and the unique parameter of the card, and this information is supplied to the encryption module 41 along with the PIN supplied by the individual via a keyboard 42. The encryption module 41 operates in identically the same manner as previously described when the card was prepared under control of one or more encryption key codes $K_1$, $K_2$, etc., to produce an offset$_A$, at its output. This output is compared in comparator 45 with the offset$_A$ that is read from the card by card transducer 27. Favorable comparison of these two offsets indicates that the card is authentic, the proper individual is using it and the credit balance is unaltered (and may be displayed as desired when read from the card, not shown). An unfavorable comparison of the two offsets means one or more of the bank number, account number, balance, credit card parameter, offset$_A$ or PIN has been altered, and the card-controlled transaction can be halted.

Where a new transaction is to take place following favorable comparison of the two offsets, the data involved which affects the account balance (such as a deposit or a debit) is supplied to an arithmetic unit 47 for calculating a new balance$_B$. This new balance$_B$ 49 is supplied to the encryption module 41 along with all the other information that is present upon reading data from the card, plus the individual's PIN, for producing a new offset$_B$ 43 for that balance$_B$ in the same manner as when the card was prepared initially. The new balance$_B$ and the new offset$_B$ associated therewith are recorded on the card 9 via card transducer 27 for the next use of the card in the same manner using the same or similar terminal equipment.

What is claimed is:

1. The method of controlling a secured transaction using a unique card having an unalterable unique card code which is assigned to an individual who selects his own individual identification number, the method comprising the steps of:

sensing the unique card code of a card;
encrypting the sensed card code in logical combination with the individual's identification number, account code and account value to produce an offset; and
recording on the card the account value and said offset.

2. The method of controlling a secured transaction according to claim 1 comprising the steps of:

sensing the unique card code, the account code, the account value and the offset on the card;
encrypting the sensed card code in said logical combination with the individual's identification number, account code and account value to produce an offset; and
comparing the produced offset with the offset sensed from the card for controlling the transaction in response to the parity thereof.

3. Apparatus for controlling a secured transaction using a unique card which has an unalterable unique card code and which is assigned to an individual who selects his own individual identificaton number, the apparatus comprising:

- card transducer means for receiving a card therein and for sensing the unique card code thereon;
- encryption means coupled to the card transducer means and coupled to receive code information including the individual's identification number, his account code and his account value for encrypting the same in accordance with a logical combination thereof to produce an offset; and
- means coupling the offset to the card transducer means for recording on the card the account value and said offset.

4. Apparatus as in claim 3 wherein:

- said card transducer means receives a card and senses the card code, the account code, the account value and the offset thereon; and
- said encryption means is coupled to said card transducer means to receive the card code, the account code, the account value and the individual's identification number and produces an offset therefrom in accordance with said logical combination thereof; and
- comparator means is coupled to said encryption means and said card transducer means for comparing the offsets therefrom for parity to control the transaction.

* * * * *